United States Patent
Decker et al.

(10) Patent No.: US 7,338,704 B2
(45) Date of Patent: Mar. 4, 2008

(54) COATING COMPOSITION HAVING FLUORESCENT COLORANTS

(75) Inventors: Eldon L. Decker, Gibsonia, PA (US); Calum H. Munro, Wexford, PA (US); Robert E. Jennings, Ellwood City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/661,964

(22) Filed: Sep. 12, 2003

(65) Prior Publication Data

US 2005/0056189 A1 Mar. 17, 2005

(51) Int. Cl.
*B32B 5/16* (2006.01)
*B32B 18/00* (2006.01)
*C09K 11/06* (2006.01)

(52) U.S. Cl. ............... 428/323; 428/324; 428/325; 428/327; 428/330; 252/301.16; 252/301.33; 252/301.36; 252/501.1

(58) Field of Classification Search ........ 428/323–325, 428/327–330, 332, 340, 411.1, 913; 252/301.16, 252/301.33, 301.36, 501.1
See application file for complete search history.

(56) References Cited

U.S. PATENT DOCUMENTS

| | | | | |
|---|---|---|---|---|
| 4,172,063 A | * | 10/1979 | O'Brill | 524/5 |
| 4,472,479 A | * | 9/1984 | Hayes et al. | 428/32.74 |
| 4,702,574 A | * | 10/1987 | Bawa | 351/162 |
| 4,904,508 A | | 2/1990 | Madonia | 428/31 |
| 5,135,568 A | * | 8/1992 | Fasano | 523/218 |
| 5,276,075 A | | 1/1994 | Santini | |
| 5,472,737 A | | 12/1995 | Anders | |
| 5,494,291 A | | 2/1996 | Kennedy | 473/378 |
| 5,762,698 A | | 6/1998 | Atkins et al. | 106/271 |
| 2004/0241332 A1 | | 12/2004 | Kreis et al. | |

FOREIGN PATENT DOCUMENTS

| | | |
|---|---|---|
| JP | 04094774 | 7/1992 |
| JP | 06142608 | 8/1994 |
| WO | WO 03/042307 | 5/2003 |

OTHER PUBLICATIONS

Rainer Hiller, Paints and Coatinigs, *Ullmann's Encyclopedia of Industrial Chemistry*, Copyright © 2002 by Wiley-VCH Verlag GmbH & Co. KgaA, pp. 1-11.

* cited by examiner

*Primary Examiner*—Sheeba Ahmed
(74) *Attorney, Agent, or Firm*—Diane R. Meyers

(57) ABSTRACT

A coating composition containing a resinous binder with colorants and reflective pigments. The colorants absorb visible light at a first wavelength and produce fluorescent light at a second wavelength band when exposed to visible light. When applied to a substrate, the coating composition appears as one color on face from the specular reflection of the colorants off the reflective pigments and a different color on flop from the fluorescent light produced by the colorants.

23 Claims, 1 Drawing Sheet

COATING COMPOSITION HAVING FLUORESCENT COLORANTS

BACKGROUND OF THE INVENTION

1. Field of the Invention

The present invention relates to coating compositions containing fluorescent colorants, more particularly, to coating compositions containing reflective pigments and colorants which absorb visible light in a first wavelength band and produce fluorescent light at a second wavelength band when exposed to visible light.

2. Prior Art

Colored coating compositions typically include colorant particles dispersed in a resinous binder. The coating composition may further include reflective pigments, such as aluminum flake or metal oxide coated mica or other color effect pigment compositions or substrate-hiding materials, such as titanium dioxide. Conventional automotive solid-colored coatings include a resin and colored pigments which determine the desired coloration of the coating. Typically, solid color pigments are of a size such that they will scatter incident light effectively. The scattering will be in all directions.

Conventionally, in a pigmented coating composition, light that is scattered back out of the coating is described as being diffusely reflected while light that is scattered forwards through the coating composition is described as diffuse transmission. This scattering, in particular diffuse reflectance, is often desirable, providing opacity to the coating and hiding the surface of a coated article. Solid color pigments also typically absorb a portion of the incident light such that the light that is diffusely scattered and the remainder that is diffusely transmitted has a perceived color. Typically, this perceived color does not vary greatly with viewing angle. For those coating compositions that further include reflective pigments, such as aluminum flake or metal oxide coated mica or other color effect pigment compositions, the portion of the incident light that is not absorbed or diffusely reflected by the colored pigment will interact with these color effect pigments. This portion of incident light may be specularly reflected by aluminum flake, or may interact with the coated mica or other effect pigment to produce a reflection whose perceived color is influenced by the structure of the pigment via an interference phenomenon. If this portion is specularly reflected by aluminum flake, there may be a perceived change in the color of the coating composition, typically described as flop. The perceived color will appear bright at viewing angles close to specular (on face), and appear to darken at viewing angles far from specular (on flop). If this portion undergoes interference on interaction with coated mica flake, there may also be a perceived change in the color of the coating composition, typically in hue as well as lightness or darkness. This viewing angle-dependent colored appearance of the coated surface produces color effects which are perceived positively by customers as being highly desirable, particularly as styling tools in automotive coatings.

Angle-dependent color effect pigments that result in hue changes (goniochromatic pigments) typically are interference pigments, such as mica pigments coated with a metal oxide. Interference pigments can be complex to prepare and are costly to include in a color effect coating composition.

Accordingly, a need remains for a coating composition having an angle-dependent color effect which may be produced cost effectively.

SUMMARY OF THE INVENTION

This need is met by the coating composition of the present invention which includes a resinous binder having dispersed therein colorants and reflective pigments. The colorants absorb visible light at a first wavelength band and produce fluorescent light at a second wavelength band when exposed to visible light. The colorants may be fluorescent dyes or fluorescent pigments. The color effect involves a balance between specularly reflected light, diffusely reflected light and fluorescence induced light. At angles close to the specular angle (on face) the reflected light is dominated by specular reflection and fluorescent induced light is not perceivable. At angles far from specular (on flop) the observed light is dominated by the fluorescence of the colorant resulting in a different color from that seen on face. The fluorescence induced light is dependent on both the incident light source wavelength and intensity, hence the coating composition changes color as a function of time of day, weather conditions, and the like.

A complete understanding of the invention will be obtained from the following description when taken in connection with the accompanying drawing figures wherein like reference characters identify like parts throughout.

DETAILED DESCRIPTION OF THE PREFERRED EMBODIMENTS

Figure 1:
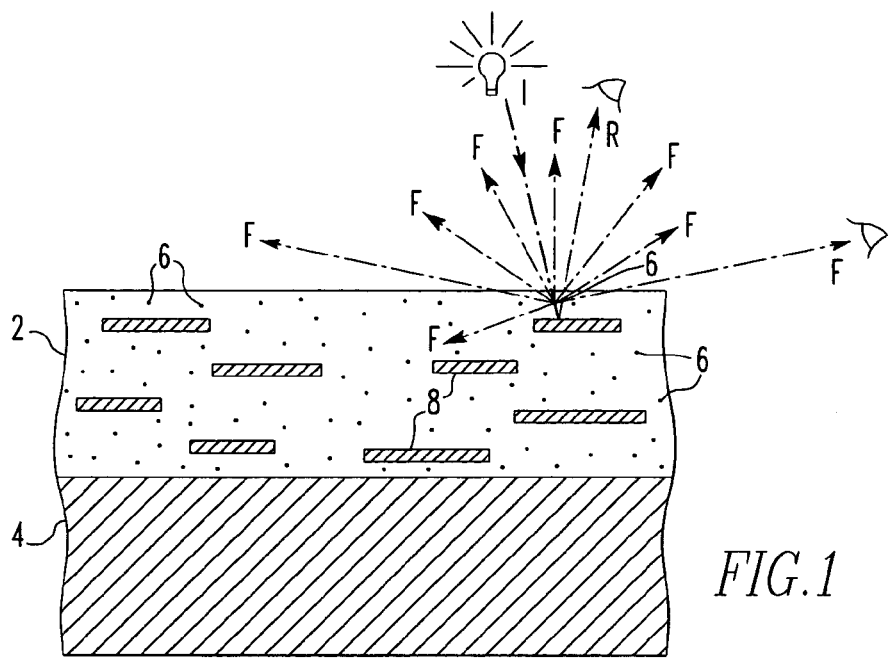
FIG. 1 is a cross-sectional view of one embodiment of a coated substrate of the present invention having colorants and reflective pigments.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Various numerical ranges are disclosed in this patent application. Because these ranges are continuous, they include every value between the minimum and maximum values. Unless expressly indicated otherwise, the various numerical ranges specified in this application are approximations.

The present invention is depicted in FIG. 1 as including a coating 2 applied to a substrate 4. The coating 2 includes colorants 6 dispersed in a resinous binder along with platelet-like reflective pigments 8. As used herein, the visible spectrum includes wavelengths of about 400 nanometers (nm) to 700 nanometers (nm).

Figure 2:
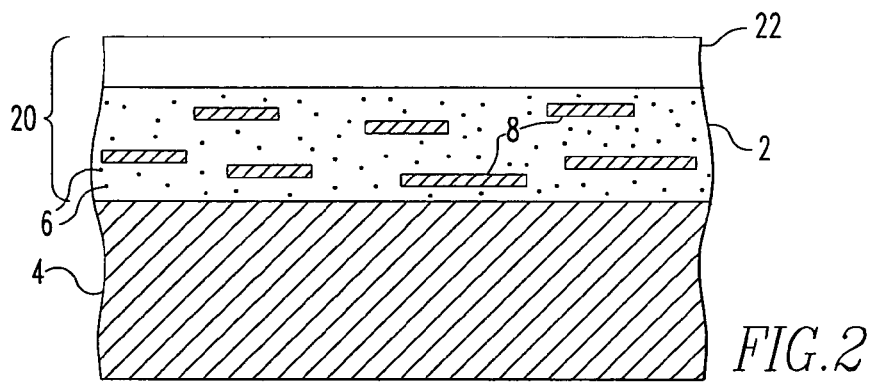
FIG. 2 is another embodiment of a coated substrate of the present invention having an uncolored topcoat.

The embodiment shown in FIG. 2 includes a coating 20 having a layer 2 as described above as a basecoat and an uncolored polymeric composition as a top layer 22. The top layer 22 provides additional features to the coating 20, such as scratch resistance and the like. The resinous binders which are present in each of layers 2 and 22 may be the same or different from each other.

Figure 3:
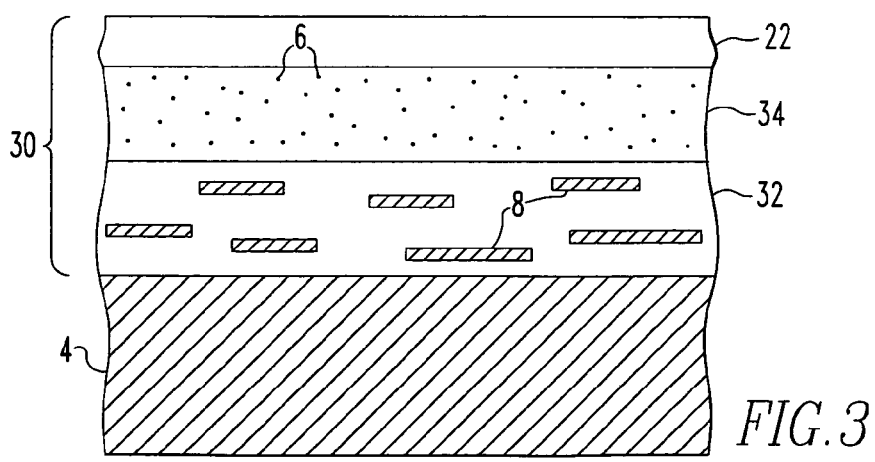
FIG. 3 is another embodiment of a coated substrate of the present invention having the colorants and reflective pigments in separate layers and an uncolored topcoat.

In another embodiment of the invention shown in FIG. 3, the colorants 6 and the reflective pigments 8 are present in distinct layers within a coating 30. The coating 30 includes a basecoat or lower layer 32 containing the reflective pigments, an upper layer 34 containing the colorants 6, and a top coat 22. The resinous binders which are present in each of layers 22, 32 and 34 may be the same or different from each other. In this embodiment, incident light has a high likelihood of striking colorants 6 in the layer 34 before reaching the reflective pigments 8 in the layer 32. In this manners reflection of light passing through the colorants 6 but not absorbed thereby is maximized while the likelihood of visible light striking the reflected pigments 8 without having been partially absorbed by the colorants 6 is minimized. The colorants 6, the reflective pigments 8 and the resinous binder are described in turn hereinafter.

Colorants

The colorants of the present invention may be pigments or dyes which absorb visible light at a first wavelength band and produce fluorescent light at a second wavelength band when exposed to visible light. When polychromatic visible light strikes the colorants, a portion of the light is absorbed by the colorants. The non-absorbed wavelengths are reflected by the reflective pigments included in the coating composition and exhibit a particular color, such as green or magenta. The absorbed wavelengths of light create an increased energy state in the colorants which is subsequently dissipated as fluorescent light in all directions from the colorants.

As shown in FIG. 1, the incident light I passes through a colorant particle 6. The incident light I is partially absorbed by the colorant 6. Light waves not absorbed by the colorant 6 are reflected by the reflective pigment 8 as a reflected light R. The energy of the wavelengths of light absorbed by the colorant 6 is dissipated in the form of fluorescent rays F in all directions away from the reflective pigment 8. A viewer of the coating sees one color on face from the specular reflection of the colorants 6 off the reflective pigments 8 (as rays R, only one being shown) and a different color on flop from the fluorescent light produced by the colorants 6 (as rays F). Although the fluorescent light F is present in all directions including on face, the reflected light R dominates on face and the fluorescent light F is not perceived.

Suitable materials for the colorants are dyes and pigments. Examples of dyes include acridines, anthraquinones, coumarins, diphenylmethanes, diphenylnaphylmethanes, quinolones, stilbenes, and triphenylmethanes.

The pigments may be inorganic or organic. Suitable organic pigments include azo (monoazo, disazo), naphthol, naphthol AS, salt type (lakes), benzimidazolone, condensation, metal complex, isoindolinone, isoindoline and polycyclic (phthalocyanine, quinacridone, perylene, perinone, diketopyrrolopyrrole, thioindigo, anthraquinone, indanthrone, anthrapyrimidine, flavanthrone, pyranthrone, anthanthrone, dioxazine, triarylcarbonium, quinophthalone) pigments and mixtures thereof. The size of the pigment is selected so that the pigment particles will not scatter light effectively. Such scattering would induce significant diffuse reflectance that would be observed over a wide range of viewing angles. This would mask the fluorescence and diminish the change perceived in color with differing viewing angles.

A suitable primary particle size for the pigments is less than about 150 nm, or less than about 70 nm, or less than about 30 nm. The primary particles may be non-agglomerated. The dispersed particle size is the size of the individual particles (primary particles) or agglomerates of primary particles. Pigment particles may be prepared by milling bulk colorants, e.g., organic pigments, with milling media having a particle size of less than about 0.5 mm, or less than 0.3 mm or about 0.1 mm or smaller. The pigment particles are milled to nanoparticulate sizes in a high energy mill in an organic solvent system, such as butyl acetate using a dispersant, such as Solsperse® 32,500 available from Avecia, Inc. of Wilmington, Del., or in water using a dispersant, such as Solsperse® 27,000 available from Avecia, Inc. with an optional polymeric grinding resin. Other suitable methods of producing the colorants of the present invention include crystallization, precipitation, gas phase condensation and chemical attrition (i.e., partial dissolution).

Reflective Pigment

The coating composition of the present invention also includes reflective pigments 8. The reflective pigments may be in platelet form that include graphite, aluminum, metal oxide coated mica, metallic covered glass flake or other lustrous flake or other scattering members, such as described in U.S. patent application Ser. No. 10/165,056, filed Jun. 7, 2002, entitled "Use of Nanoparticulate Organic Pigments in Paint and Coatings", incorporated herein by reference.

Resinous Binder

The coating composition of the present invention includes a resinous binder. Conventional resinous binders may be used with the colorants described herein in automotive OEM compositions, automotive refinish compositions, industrial coatings, architectural coatings, electrocoatings, powder coatings, coil coatings and aerospace coatings.

Suitable resinous binders include a thermoplastic and thermosetting coating composition having components such as hydroxyl, carboxylic acid, carbamate, amide, or epoxy-containing acrylic copolymers and hydroxyl, carboxylic acid, or carbamate-containing polyester polymers and oligomers, and isocyanate, hydroxyl, or carbamate-containing polyurethane polymers, or amine or isocyanate-containing polyureas which can enhance cure rate, appearance and other physical properties of the cured coating.

The acrylic polymers, if used, are typically copolymers of acrylic acid or methacrylic acid, hydroxyalkyl esters of acrylic or methacrylic acid such as hydroxyethyl methacrylate or hydroxypropyl acrylate, and/or carbamoyloxyethyl methacrylate, acrylamide or glycidyl methacrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl, carboxylic acid, carbamate, amide or epoxy functionality.

Besides acrylic polymers, the curable coating composition of the present invention can contain a polyester polymer or oligomer. Such polymers may be prepared in a known manner by condensation of polyhydric alcohols and polycarboxylic acids. Suitable polyhydric alcohols include ethylene glycol, neopentyl glycol, trimethylol propane and pentaerythritol.

Suitable polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an anhydride of a dicarboxylic acid such as hexahydrophthalic anhydride with a diol such as neopentyl glycol in a 1:2 molar ratio. Carbamate functionality can be introduced into the polyester by transcarbamylating with a material such as methyl carbinate.

Where it is desired to enhance air drying, suitable drying oil fatty acids may be used and include those derived from linseed oil, soya bean oil, tall oil, dehydrated castor oil or tung oil.

The polyesters are made to contain free terminal hydroxyl, carbamate and/or carboxyl groups that are available for further crosslinking reactions.

Polyurethane polymers containing terminal isocyanate or hydroxyl groups may also be used. The polyurethane polyols or NCO-terminated polyurethanes that can be used are those prepared by reacting polyols including polymeric polyols with polyisocyanates. The polyurea-containing terminal isocyanate or primary or secondary amine groups which can be used are those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates are those described in U.S. Pat. No. 4,046,729 at col. 5, line 26 to col. 6, line 28, hereby incorporated by reference. Examples of suitable polyols are those described in U.S. Pat. No. 4,046,729 at col. 7, line 52 to col. 10, line 35, hereby incorporated by reference. Examples of suitable polyamines are those described in U.S. Pat. No. 4,046,729 at col. 6, line 61 to col. 7, line 32 and in U.S. Pat. No. 3,799,854 at col. 3, lines 13 to 50, both hereby incorporated by reference.

Suitable curing agents for the curable coating composition include aminoplast resins and phenoplast resins and mixtures thereof, as curing agents for hydroxyl, carboxylic acid, amide and carbamate functional group containing materials. Examples of aminoplast and phenoplast resins suitable as curing agents in the curable compositions of the present invention are those described in U.S. Pat. No. 3,919,351 at col. 5, line 22 to col. 6, line 25, hereby incorporated by reference.

Polyisocyanates and blocked polyisocyanates as curing agents for OH and primary and/or secondary amino group-containing materials are well known in the art. Examples of polyisocyanates and blocked isocyanates suitable for use as curing agents in the curable compositions of the present invention are those described in U.S. Pat. No. 4,546,045 at col. 5, lines 16-38; and in U.S. Pat. No. 5,468,802 at col. 3, lines 48-60, both hereby incorporated by reference.

Anhydrides as curing agents for OH and primary and/or secondary amino group containing materials are well known in the art. Examples of anhydrides suitable for use as curing agents in the curable compositions of the present invention are those described in U.S. Pat. No. 4,798,746 at col. 10, lines 16-50; and in U.S. Pat. No. 4,732,790 at col. 3, lines 41 to 57, both hereby incorporated by reference.

Polyepoxides as curing agents for COOH functional group-containing materials are well known in the art. Examples of polyepoxides suitable for use as curing agents in the curable compositions of the present invention are those described in U.S. Pat. No. 4,681,811 at col. 5, lines 33 to 58, hereby incorporated by reference.

Polyacids as curing agents for epoxy functional group-containing materials are well known in the art. Examples of polyacids suitable for use as curing agents in the curable compositions of the present invention are those described in U.S. Pat. No. 4,681,811 at col. 6, line 45 to col. 9, line 54, hereby incorporated by reference.

Polyols, that is, material having an average of two or more hydroxyl groups per molecule, can be used as curing agents for NCO functional group containing materials and anhydrides and esters and are well known in the art. Examples of said polyols are those described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, both hereby incorporated by reference.

Polyamines can also be used as curing agents for NCO functional group containing materials and for carbonates and unhindered esters and are well known in the art. Examples of polyamines suitable for use as curing agents in the curable compositions of the present invention are those described in U.S. Pat. No. 4,046,729 at col. 6, line 61 to col. 7, line 26, hereby incorporated by reference.

The decorative and protective coating composition may be used as a single coating, as a clear top coating composition, as a base coating in a two-layered system, as layers of a multi-layered system including a clear top coating composition, colorant layer and base coating composition, or as a primer layer.

The concentration of the colorants in the coating composition is about 0.001 wt. % to about 50 wt. % or about 0.001 wt. % to about 20 wt. %. The concentration of the reflective pigments in the coating composition is about 0.1 wt. % to about 50 wt. %.

The invention is further described by reference to the following examples.

EXAMPLES

Examples 1-9 describe the production of coating compositions of the present invention containing colorants with and without reflective pigments.

Examples 10-20 describe coated articles using the compositions of Examples 1-9. Example 15 corresponds to the embodiment of FIG. 1. Examples 10, 11, 16 and 17 correspond to the embodiment of FIG. 2. Examples 12, 18 and 19 correspond to the embodiment of FIG. 3.

Examples 13, 14 and 20 are comparatives.

Example 1

An 11.10 g dispersion of Pigment Yellow 139 milled to nanoparticulate size using a high energy mill with a milling media of about 0.1 mm, was blended with 37.76 g of aluminum flake toner D769 available from PPG Industries, Pittsburgh, Pa. and 51.13 g of solvent reducer package D871 available from PPG Industries, Pittsburgh, Pa.

Example 2

A 17.92 g dispersion of Pigment Yellow 128 milled to nanoparticulate size using a high energy mill with a milling media of about 0.1 mm, was blended with 34.87 g of aluminum flake toner D769 and 47.21 g of solvent reducer package D871.

Example 3

A 6.35 g dispersion of Pigment Yellow 139, milled to nanoparticulate size using a high energy mill with a milling media of about 0.1 mm, was blended with 62.30 g of resinous clear coat binder Concept® DCU2042 available from PPG Industries, Pittsburgh, Pa., 17.69 g isocyanate hardener DCX61 hardener available from PPG Industries, Pittsburgh, Pa. and 13.66 g of solvent reducer package D870 Reducer available from PPG Industries, Pittsburgh, Pa.

Example 4

A 10.74 g dispersion of Pigment Yellow 128 milled to nanoparticulate size using a high energy mill with a milling media of about 0.1 mm, was blended with 59.39 g of resinous clear coat binder Concept® DCU2042, 16.86 g isocyanate hardener DCX61 and 13.02 g of solvent reducer package D870.

Example 5

A 9.35 g dispersion of Pigment Yellow 139 milled to nanoparticuiate size using a high energy mill with a milling media of about 0.1 mm, was blended with 40.42 g of aluminum flake toner Concept® DMC982 available from PPG Industries, Pittsburgh, Pa., 4.95 g resinous clearcoat binder Concept® DCU2042, 12.22 g acetone, 12.98 g solvent reducer package D870, and 20.08 g isocyanate hardener DCX61.

Example 6

A 10 g solution of Rhodamine 6G (0.2% by weight in methanol, available from Aldrich Chemical Co., Inc., Milwaukee, Wis.,) was blended with 40.00 g of aluminum flake toner D769 and 50 g of solvent reducer package D871.

Example 7

A 10 g solution of oxazine-4-perchlorate (0.2% by weight in methanol, available from Fisher Scientific, Pittsburgh, Pa.) was blended with 40.00 g of aluminum flake toner D769 and 50 g of solvent reducer package D871.

Example 8

A 4 g solution of Rhodamine 6G was blended with 63 g of resinous clear coat binder Concept® DCU2042, 18 g isocyanate hardener DCX61 and 15 g of solvent reducer package D870.

Example 9

A 4 g solution of oxazine-4-perchlorate was blended with 63 g of resinous clear coat binder Concept® DCU2042, 18 g isocyanate hardener DCX61 and 15 g of solvent reducer package D870.

Example 10

The coating composition of Example 1 was spray applied to a substrate as a basecoat. After a 30 -minute dry time under ambient conditions, the coated substrate was further sprayed with a two-component protective clearcoat containing a blend of resinous clearcoat binder Concept® DCU2042, solvent reducer package D870, and isocyanate hardener DCX61 mixed according to the supplier's recommendations. After a further 60 minutes of dry time, the coated article was baked for 1 hour at 60° C. After the bake period, the coated article was inspected visually. When viewed at high angles close to normal incidence, the article appeared to be orange in color with a metallic luster. However, when viewed at shallow angles, the color changed to a yellowish green and showed less metallic luster.

Example 11

The process of Example 10 was followed using the composition of Example 2 instead of the composition of Example 1 as the basecoat and visually inspected. When viewed at high angles close to normal incidence, the article appeared to be yellow in color with a metallic luster. However, when viewed at shallow angles, the color changed to a green and showed less metallic luster.

Example 12

The coating composition of Example 4 was spray applied as a tinted clearcoat over a silver metallic basecoat. After a 30-minute dry time under ambient conditions, the coated substrate was further sprayed with a two component protective clearcoat containing a blend of resinous clearcoat binder Concept® DCU2042, solvent reducer package D870, and isocyanate hardener DCX61 mixed according to the supplier's recommendations. After a further 60 minutes of dry time, the coated article was baked for 1 hour at 60° C. After the bake period the coated article was inspected visually. When viewed at high angles close to normal incidence, the article appeared to be yellow in color with a metallic luster. However, when viewed at shallow angles, the color changed to a green and showed less metallic luster.

Comparative Example 13

The process of Example 12 was performed except that a white basecoat was used instead of a silver metallic basecoat and visually inspected. When viewed at high angles close to normal incidence, the article appeared to be yellow in color. When viewed at shallow angles, the article also appeared to be yellow in color. No color effect was evident.

Comparative Example 14

The process of Example 13 was followed using the composition of Example 3 instead of the composition of Example 4 as the tinted clearcoat and visually inspected. When viewed at high angles close to normal incidence, the article appeared to be orange in color. When viewed at shallow angles, the article also appeared to be orange in color. No color effect was evident.

Example 15

The coating composition of Example 5 was spray applied to a suitable substrate as a direct gloss monocoat. After 60 minutes of dry time, the coated article was baked for 1 hour at 60° C. After the bake period the coated article was inspected visually. When viewed at high angles close to normal incidence, the article appeared to be orange in color with a metallic luster. However, when viewed at shallow angles, the color changed to a green and showed less metallic luster.

Example 16

The process of Example 10 was followed using the composition of Example 6 instead of the composition of Example 1 as the basecoat and visually inspected. When viewed at high angles close to normal incidence, the article appeared to be magenta in color with a metallic luster. However, when viewed at shallow angles, the color changed to orange and showed less metallic luster.

Example 17

The process of Example 10 was followed using the composition of Example 7 instead of the composition of Example 1 as the basecoat and visually inspected. When viewed at high angles close to normal incidence, the article appeared to be blue in color with a metallic luster. However, when viewed at shallow angles, the color changed to red and showed less metallic luster.

Example 18

The process of Example 12 was followed using the composition of Example 8 instead of the composition of Example 4 as the tinted clearcoat and visually inspected. When viewed at high angles close to normal incidence, the article appeared to be magenta in color with a metallic luster. However, when viewed at shallow angles, the color changed to orange and showed less metallic luster.

Example 19

The process of Example 12 was followed using the composition of Example 9 instead of the composition of Example 4 as the tinted clearcoat and visually inspected. When viewed at high angles close to normal incidence, the article appeared to be blue in color with a metallic luster. However, when viewed at shallow angles, the color changed to a red and showed less metallic luster.

Comparative Example 20

The process of Example 18 was performed except that a white basecoat was used instead of a silver metallic basecoat and visually inspected. When viewed at high angles close to normal incidence, the article appeared to be magenta in color. When viewed at shallow angles, the article also appeared to be magenta in color. No color effect was evident.

Whereas particular embodiments of this invention have been described above for purposes of illustration, it will be evident to those skilled in the art that numerous variations of the details of the present invention may be made without departing from the invention as defined in the appended claims.

We claim:

1. A coating composition for applying to a substrate comprising:
a resinous binder having dispersed therein colorants and reflective pigments, wherein said colorants absorb visible light at a first wavelength band and produce fluorescent light at a second wavelength band when exposed to visible light, said coating composition exhibiting a first appearance on face dominated by absorbance of light by said colorants and a second appearance on flop dominated by fluorescence of the colorants, wherein the concentration of said colorants in the coating composition is about 0.001 wt. % to about 50 wt. %, and wherein when the colorant comprises colorant pigments, the size of the pigment is selected so that the pigment particles will not scatter light effectively.

2. The coating composition of claim 1, wherein the concentration of said colorants in said coating composition is about 0.001 wt. % to about 20 wt. %.

3. The composition of claim 1, wherein said colorants comprise dyes or pigments.

4. The coating composition of claim 3, wherein said dyes are selected from the group consisting of acridines, anthraquinones, coumarins, diphenylmethanes, diphenylnaphthylmethanes, quinolones, stilbenes and triphenylmethanes.

5. The coating composition of claim 3, wherein said pigments are selected from the group consisting of monoazo, disazo, naphthol, naphthol AS, lake, benzimidazolone, metal complex, isoindolinone, isoindoline, phthalocyanine, quinacridone, perylene, perinone, diketopyrrolopyrrole, thioindigo, anthraquinone, indanthrone, anthrapyrimidine, flavanthrone, pyranthrone, anthanthrone, dioxazine, triarylcarbonium, and quinophthalone pigments.

6. The coating composition of claim 5, wherein said pigments have a particle size of less than about 150 nm.

7. The coating composition of claim 6, wherein said pigments are produced by milling organic pigments with milling media having a particle size less than about 0.3 mm.

8. The composition of claim 6, wherein said pigments are produced by milling organic pigments with milling media having a particle size less than about 0.1 mm.

9. The coating composition of claim 1, wherein said resinous binder comprises a curable polymer composition.

10. The coating composition of claim 1, wherein said reflective pigment is selected from the group consisting of aluminum flake, metal oxide coated mica, graphite flake, and metallic covered glass flake.

11. The coating composition of claim 10, wherein the concentration of said reflective pigment in said coating composition is about 0.1 wt. % to about 50 wt. %.

12. A coated article comprising a substrate and a multilayer coating comprising a first layer and a second layer underlying the first layer, wherein the first layer and the second layer each comprise a resinous binder, wherein a colorant is present in the first layer and reflective pigments are present in the second layer underlying the first layer, wherein the colorants absorbs visible light at a first wavelength band and produces fluorescent light at a second wavelength band when exposed to visible light, the coated article exhibiting a first appearance on face dominated by absorbance of light by the colorants and a second appearance on flop dominated by fluorescence of the colorants, and wherein the concentration of the colorants in the coating composition applied to the substrate as the first layer is about 0.001 wt. % to about 50 wt. %.

13. The coated article of claim 12, further comprising a third layer overlying said first layer, said third layer comprising an uncolored polymer composition.

14. A coating composition for applying to a substrate comprising:
a resinous binder having dispersed therein colorant dyes and reflective pigments, wherein said dyes absorb visible light at a first wavelength band and produce fluorescent light at a second wavelength band when exposed to visible light, said coating composition exhibiting a first appearance on face dominated by absorbance of light by said colorant dyes and a second appearance on flop dominated by fluorescence of the colorant dyes, said dyes being selected from the group consisting of acridines, anthraquinones, coumarins, diphenylmethanes, diphenylnaphthylmethanes, quinolones, stilbenes and triphenylmethanes.

15. The coating composition of claim 14, wherein the concentration of said colorant dyes in said coating composition is about 0.001 wt. % to about 50 wt. %.

16. The coating composition of claim 14, wherein the concentration of said reflective pigment in said coating composition is about 0.1 wt. % to about 50 wt. %.

17. A coating composition for applying to a substrate comprising:
a resinous binder having dispersed therein colorant pigments and reflective pigments, wherein said colorant pigments absorb visible light at a first wavelength band and produce fluorescent light at a second wavelength band when exposed to visible light, said coating composition exhibiting a first appearance on face dominated by absorbance of light by said colorants and a second appearance on flop dominated by fluorescence of the colorant pigments, said colorant pigments being selected from the group consisting of monoazo, disazo, naphthol, naphthol AS, lake, benzimidazolone, metal complex, isoindolinone, isoindoline, phthalocyanine, quinacridone, perylene, perinone, diketopyrrolopyrrole, thioindigo, anthraquinone, indanthrone, anthrapyrimidine, flavanthrone, pyranthrone, anthanthrone, dioxazine, triarylcarbonium, and quinophthalone pigments, wherein the size of the pigment particles is selected so that the pigment particles will not scatter light effectively.

18. The coating composition of claim 17, wherein said colorant pigments have a particle size of less than about 150 nm.

19. The coating composition of claim 17, wherein the concentration of said colorant pigments in said coating composition is about 0.001 wt. % to about 20 wt. %.

20. The coating composition of claim 17, wherein the concentration of said reflective pigment is in said coating composition is about 0.1 wt. % to about 50 wt. %.

21. A coating composition for applying to a substrate comprising:
a resinous binder having dispersed therein colorants and reflective pigments, wherein said colorants absorb visible light at a first wavelength band and produce fluorescent light at a second wavelength band when exposed to visible light, said coating composition exhibiting a first appearance on face dominated by absorbance of light by said colorants and a second appearance on flop dominated by fluorescence of the colorants, wherein said reflective pigment is selected from the group consisting of aluminum flake, metal oxide, coated mica, graphite flake, and metallic covered glass flake, and wherein the reflective pigment present in the coating composition in a concentration of about 0.1 wt % to about 50 wt. % and wherein when the colorant comprises colorant pigments, the size of the colorant pigment particles is selected so that the pigment particle will not scatter light effectively.

22. A coating composition for applying to a substrate comprising:
a resinous binder having dispersed therein colorants and reflective pigments, wherein said colorants absorb visible light at a first wavelength band and produce fluorescent light at a second wavelength band when exposed to visible light, said coating composition exhibiting a first appearance on face dominated by absorbance of light by said colorants and a second appearance on flop dominated by fluorescence of the colorants, wherein the concentration of said colorants in the coating composition is about 0.001 wt. % to about 50 wt. %, and wherein when said colorants comprise colorant pigments, the colorant pigments have a particle size of less than about 150 nm.

23. A coating composition for applying to a substrate comprising:
a resinous binder having dispersed therein colorant pigments and reflective pigments, wherein said colorant pigments absorb visible light at a first wavelength band and produce fluorescent light at a second wavelength band when exposed to visible light, said coating composition exhibiting a first appearance on face dominated by absorbance of light by said colorant pigments and a second appearance on flop dominated by fluorescence of the colorant pigments, wherein the concentration of said colorant pigments in the coating composition is about 0.001 wt. % to about 50 wt. %, and wherein the colorant pigments have a particle size of less than about 150 nm.

* * * * *